(12) United States Patent
Takeuchi et al.

(10) Patent No.: US 12,043,297 B2
(45) Date of Patent: Jul. 23, 2024

(54) DRIVING OPERATION MANAGEMENT SYSTEM, MANAGEMENT SERVER, TERMINAL DEVICE, AND DRIVING OPERATION MANAGEMENT METHOD

(71) Applicant: Mitsubishi Electric Corporation, Tokyo (JP)

(72) Inventors: Takeshi Takeuchi, Tokyo (JP); Eri Moriya, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 309 days.

(21) Appl. No.: 17/621,264

(22) PCT Filed: Jul. 24, 2019

(86) PCT No.: PCT/JP2019/029072
§ 371 (c)(1),
(2) Date: Dec. 21, 2021

(87) PCT Pub. No.: WO2021/014622
PCT Pub. Date: Jan. 28, 2021

(65) Prior Publication Data
US 2023/0146306 A1  May 11, 2023

(51) Int. Cl.
*B61L 27/10* (2022.01)
*G06Q 50/40* (2024.01)

(52) U.S. Cl.
CPC .............. *B61L 27/10* (2022.01); *G06Q 50/40* (2024.01)

(58) Field of Classification Search
CPC ................................ B61L 27/10; G06Q 50/30
See application file for complete search history.

(56) References Cited

U.S. PATENT DOCUMENTS 11,785,431 B1* 10/2023 Schlangen .............. H04W 4/80
455/41.2
2016/0121912 A1* 5/2016 Puttagunta ............. B61L 23/041
701/19

(Continued)

FOREIGN PATENT DOCUMENTS

| JP | 2007164366 A | 6/2007 |
| JP | 2012118951 A | 6/2012 |
| JP | 2015011086 A | 1/2015 |

OTHER PUBLICATIONS

Office Action dated May 10, 2022, issued in corresponding Japanese Patent Application No. 2021-534493, 4 pages including 2 pages of English Translation.

(Continued)

*Primary Examiner* — Peter D Nolan
*Assistant Examiner* — Wae L Louie
(74) *Attorney, Agent, or Firm* — BUCHANAN INGERSOLL & ROONEY PC

(57) ABSTRACT

A driving operation management system includes: an operator information accumulation unit that accumulates operator information; a mobile object information acquisition unit that acquires mobile object information; a driving operation reception unit that receives a driving operation of the operator; a service information management unit that acquires and associates the operator information and at least one of the mobile object information or operation information indicating the driving operation, and causes the acquired and associated information to be accumulated as service information; a service information accumulation unit that accumulates the service information; a determination logic setting unit that sets a determination logic for determining an operating state on the basis of the service information accumulated; a determination logic accumulation unit that accumulates the determination logic; and a deter- (Continued)

mination unit that determines the operating state using the determination logic accumulated.

7 Claims, 7 Drawing Sheets

(56) References Cited

U.S. PATENT DOCUMENTS

| | | | | |
|---|---|---|---|---|
| 2016/0200334 A1* | 7/2016 | Hilleary | ................ | B61L 23/041 |
| | | | | 246/218 |
| 2016/0221592 A1* | 8/2016 | Puttagunta | ............ | B61L 25/025 |
| 2021/0272394 A1* | 9/2021 | Cella | .................... | G06Q 10/103 |
| 2023/0146306 A1* | 5/2023 | Takeuchi | ............... | G06Q 50/40 |
| | | | | 701/19 |
| 2023/0401274 A1* | 12/2023 | Denninghoff | ...... | G06Q 30/0251 |

OTHER PUBLICATIONS

Office Action dated Dec. 14, 2021, issued in corresponding Japanese Patent Application No. 2021-534493, 7 pages including 4 pages of English Translation.
International Search Report (PCT/ISA/210) with translation and Written Opinion (PCT/ISA/237) mailed on Oct. 29, 2019, by the Japan Patent Office as the International Searching Authority for International Application No. PCT/JP2019/029072. (7 pages).
Office Action dated Apr. 29, 2022, issued in corresponding Indian Patent Application No. 202127055127, 5 pages.

* cited by examiner

| DATE AND TIME | OPER-ATOR ID | SPEED | POWER RUNNING | TEMPER-ATURE | HEART RATE |
|---|---|---|---|---|---|
| 2019/2/20 10:59:00 | 01 | 20 | 3 | 28 | 65 |
| 2019/2/20 10:59:10 | 01 | 40 | 4 | 28 | 66 |
| 2019/2/20 10:59:20 | 01 | 80 | 4 | 28 | 64 |
| 2019/2/20 10:59:30 | 01 | 120 | 4 | 27 | 60 |
| 2019/2/20 10:59:40 | 01 | 130 | 2 | 28 | 80 |

FIG.5
| DETERMINA-TION LEVEL | SOUND | SCREEN DISPLAY |
|---|---|---|
| 10 | NONE | NONE |
| 30 | NONE | ALERT LV.1 |
| 50 | SOUND 1 | ALERT LV.2 |
| 100 | SOUND 2 | ALERT LV.3 |
FIG.6
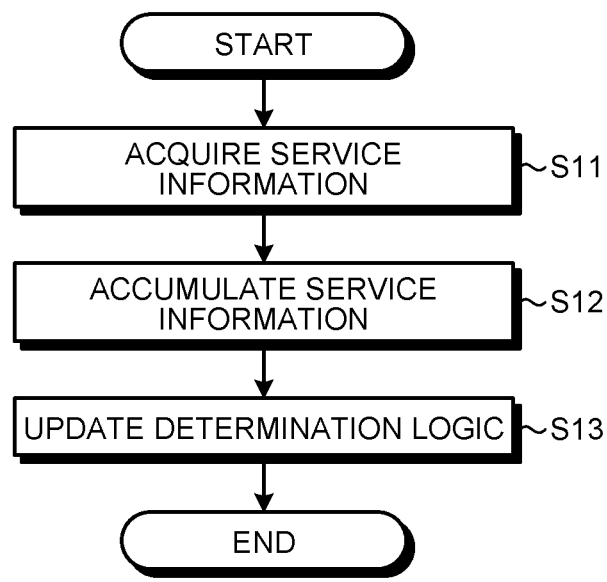
FIG.7
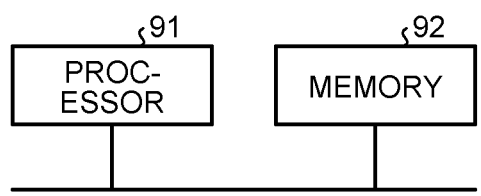

DRIVING OPERATION MANAGEMENT SYSTEM, MANAGEMENT SERVER, TERMINAL DEVICE, AND DRIVING OPERATION MANAGEMENT METHOD

FIELD

The present invention relates to a driving operation management system for determining an operating state of an operator of a train, a management server, a terminal device, and a driving operation management method.

BACKGROUND

Conventionally, there is a case where disruption of the train service, a train accident, or the like occurs due to an operator who operates the train having poor physical condition such as a sudden illness or seizure, a human error, or the like. Therefore, a technique for predicting the occurrence of the poor physical condition of the operator, the human error, or the like has been studied. Patent Literature 1 discloses a technique in which a drowsiness prevention information presenting device receives input of hours of sleep and working hours, an answer to a question about sleep and fatigue, and the like from a user, determines whether or not there is a problem with a sleep situation of the user, and presents a way of improvement if having determined that there is a problem.

CITATION LIST

Patent Literature

Patent Literature 1: Japanese Patent Application Laid-open No. 2007-164366

SUMMARY

Technical Problem

However, the technique described in Patent Literature 1 requires the input operation of the user for the drowsiness prevention information presenting device. There has thus been a problem that the accuracy of determination is reduced when necessary information is not input to the drowsiness prevention information presenting device or when information is input in error.

The present invention has been made in view of the above, and an object thereof is to provide a driving operation management system capable of improving the accuracy of determining an operating state of an operator of a train.

Solution to Problem

In order to solve the above problem and achieve the object, a driving operation management system according to the present invention includes: an operator information accumulation unit to accumulate operator information that is information indicating a state of an operator of a train; a mobile object information acquisition unit to acquire mobile object information that is information on a service state of the train; a driving operation reception unit to receive a driving operation of the operator; a service information management unit to acquire and associate the operator information and at least one of the mobile object information or operation information that indicates the driving operation received by the driving operation reception unit, and cause the acquired and associated information to be accumulated as service information; a service information accumulation unit to accumulate the service information; a determination logic setting unit to set a determination logic for determining an operating state of the operator on the basis of the service information accumulated in the service information accumulation unit; a determination logic accumulation unit to accumulate the determination logic; and a determination unit to determine the operating state of the operator using the determination logic accumulated in the determination logic accumulation unit.

Advantageous Effects of Invention

According to the present invention, the driving operation management system can improve the accuracy of determining the operating state of the operator of the train.

BRIEF DESCRIPTION OF DRAWINGS

FIG. 5 is a table illustrating an example of content of notification made by a terminal device of the driving operation management system according to the first embodiment.

FIG. 6 is a flowchart illustrating an operation in which the driving operation management system according to the first embodiment updates a determination logic.

FIG. 7 is a diagram illustrating an example of a case where processing circuitry of the management server or the like according to the first embodiment includes a processor and a memory.

DESCRIPTION OF EMBODIMENTS

Hereinafter, a driving operation management system, a management server, a terminal device, and a driving operation management method according to embodiments of the present invention will be described in detail with reference to the drawings. Note that the present invention is not limited to the embodiments.

First Embodiment

Figure 1:
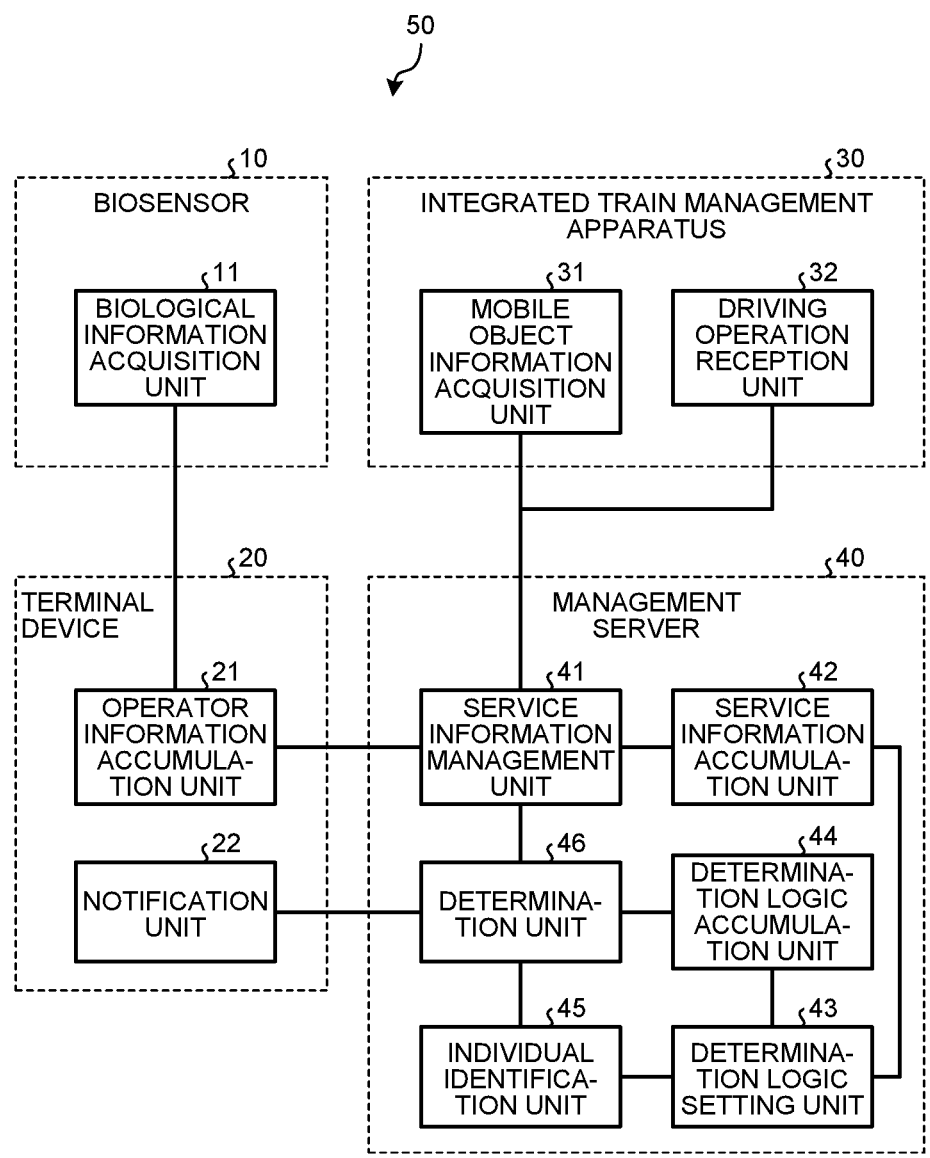
FIG. 1 is a block diagram illustrating an example of a configuration of a driving operation management system according to a first embodiment.
Figure 2:
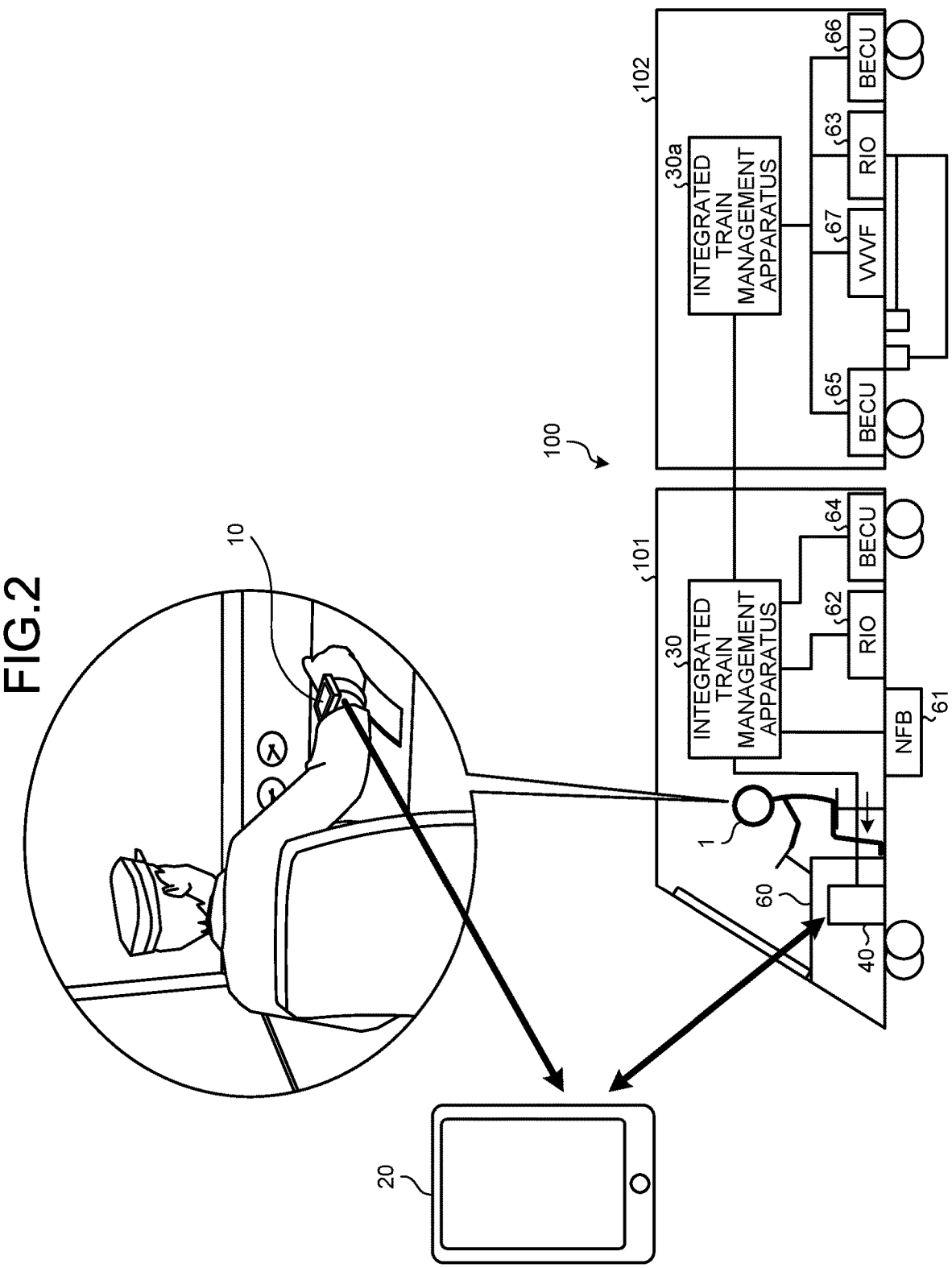
FIG. 2 is a diagram illustrating an example of installation of the driving operation management system according to the first embodiment.

FIG. 1 is a block diagram illustrating an example of a configuration of a driving operation management system 50 according to a first embodiment of the present invention. FIG. 2 is a diagram illustrating an example of installation of the driving operation management system 50 according to the first embodiment. Although FIG. 2 illustrates a train 100 of two cars including a first car 101 and a middle car 102, in reality, it is assumed that another middle car 102 or a rear car having a structure similar to that of the first car 101 is also connected to the right side of the middle car 102. Note that FIG. 2 illustrates integrated train management apparatuses 30 and 30a separately, but the present invention is not limited thereto. The integrated train management apparatuses 30 and 30a may be integrated. Hereinafter, the first car 101 and the middle car 102 of the train 100 will be described. The driving operation management system 50 includes a biosensor 10, a terminal device 20, the integrated train management apparatus 30, and a management server 40.

The biosensor 10 is worn on an operator 1 who operates the train 100. The biosensor 10 includes a biological information acquisition unit 11. The biological information acquisition unit 11 detects and acquires biological information of the operator 1 inside and outside the train 100. The biological information is, for example, mental and physical information such as a heart rate, an amount of perspiration, a line of sight, movement of an eyeball, brain waves, blood pressure, a body temperature, and a blood glucose level. Specifically, the biosensor 10 is assumed to be a heart rate meter, a thermometer, or the like having a communication function, but is not limited thereto. The biosensor 10 may be an imaging device such as a camera capable of detecting blink speed of the operator 1. The driving operation management system 50 may also include a plurality of the biosensors 10 of different types, or a plurality of the biosensors 10 of the same type. The biological information acquisition unit 11 causes an operator information accumulation unit 21 of the terminal device 20, which will be described later, to accumulate the detected biological information as operator information. Communication between the biosensor 10 and the terminal device 20 may be wireless communication or wired communication. The biosensor 10 is assumed to have identification information such as a model number that can be uniquely identified.

The terminal device 20 is a communication device carried by the operator 1 inside and outside the train 100. Specifically, the terminal device 20 is a communication device such as a tablet or a smartphone capable of wireless communication or wired communication with the biosensor 10 and the management server 40. The terminal device 20 includes the operator information accumulation unit 21 and a notification unit 22. The operator information accumulation unit 21 accumulates the operator information that is information indicating a state of the operator 1 of the train 100. In the first embodiment, the operator information accumulation unit 21 accumulates, as the operator information, the biological information of the operator 1 acquired by the biological information acquisition unit 11 of the biosensor 10. In accordance with a determination result by a determination unit 46 of the management server 40 described later, the notification unit 22 notifies the operator 1 of the determination result, that is, an operating state of the operator 1 by sound, screen display, or the like. The notification unit 22 may be installed on a cab 60 of the train 100 instead of the terminal device 20. Note that in FIG. 2, the terminal device 20 is emphasized and illustrated in a large size for easy understanding of an image of the appearance of the terminal device 20, and in reality has the size that can be carried in the train 100 by the operator 1.

The integrated train management apparatus 30 is, for example, an integrated train management system installed on the train 100. In the example of FIG. 2, the integrated train management apparatus 30 is assumed to be a central apparatus of the integrated train management system installed on the first car 101 of the train 100. Also in the train 100, it is assumed that the integrated train management apparatus 30a, which is a terminal device of the integrated train management system, is installed on the middle car 102. The integrated train management apparatus 30 is connected to each of the cab 60, a No Fuse Breaker (NFB) 61, a Remote Input Output (RIO) 62, and a Brake Electronic Control Unit (BECU) 64, thereby controlling the operation of each device and monitoring the operating state of each device. The integrated train management apparatus 30a is connected to each of an RIO 63, BECUs 65 and 66, and a Variable Voltage Variable Frequency (VVVF) 67, thereby controlling the operation of each device and monitoring the operating state of each device. In the example of FIG. 2, the integrated train management apparatus 30 acquires a control state of each device installed on the middle car 102 from the integrated train management apparatus 30a, and manages a control state of the entire train 100. Note that in FIG. 2, the devices connected to the integrated train management apparatuses 30 and 30a are merely examples, and are not limited thereto. Moreover, in FIG. 2, the operation of each device is controlled and monitored by the integrated train management apparatuses 30 and 30a, but the present invention is not limited thereto as long as information on the devices installed on the train can be acquired.

The integrated train management apparatus 30 includes a mobile object information acquisition unit 31 and a driving operation reception unit 32. The mobile object information acquisition unit 31 acquires mobile object information that is information on a service state of the train 100 while the train 100 is in service. The mobile object information is, for example, information such as a train speed, an air-conditioning temperature, or the number of passengers regarding the train 100. The driving operation reception unit 32 receives a driving operation from the outside, specifically, the operator 1. The driving operation includes power running, braking, button operation, and the like.

The management server 40 is installed on the train 100. The present embodiment describes a case where the management server 40 is installed on the train 100, that is, on a car as an example, but the present invention is not limited thereto. The driving operation management system 50 may be in a form in which the management server 40 is installed on the ground. The management server 40 includes a service information management unit 41, a service information accumulation unit 42, a determination logic setting unit 43, a determination logic accumulation unit 44, an individual identification unit 45, and the determination unit 46.

The service information management unit 41 acquires the operator information from the operator information accumulation unit 21 of the terminal device 20, acquires the mobile object information from the mobile object information acquisition unit 31 of the integrated train management apparatus 30, and acquires operation information indicating the driving operation received by the driving operation reception unit 32 from the driving operation reception unit 32 of the integrated train management apparatus 30. The service information management unit 41 associates the operator information with at least one of the mobile object information or the operation information, and causes the service information accumulation unit 42 to accumulate the information as service information. That is, the service information management unit 41 may associate the operator information, the mobile object information, and the operation information and cause the service information accumulation unit 42 to accumulate the information as the service information, may associate the operator information and the mobile object information and cause the service information accumulation unit 42 to accumulate the information as the service information, or may associate the operator information and the operation information and cause the service information accumulation unit 42 to accumulate the information as the service information. The service information is information related to the state of each device installed on the train 100 that is in service and the state of the operator 1 during service and out of service. Communication between the management server 40 and each of the terminal device 20 and the integrated train management apparatus 30 may be wireless communication or wired communication. Note that when installed on the ground, the management server 40 communicates with the terminal device 20 and the integrated train management apparatus 30 by wireless communication.

Figures 3, 4:
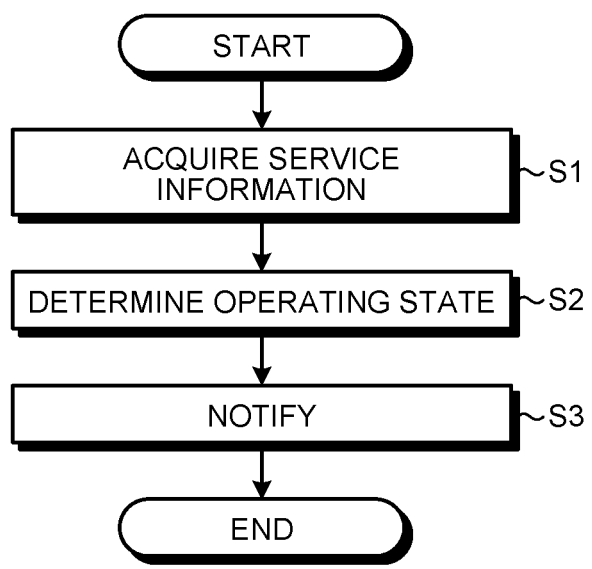
FIG. 3 is a table illustrating an example of service information accumulated in a service information accumulation unit of a management server according to the first embodiment.
FIG. 4 is a flowchart illustrating an operation in which the driving operation management system according to the first embodiment determines an operating state of an operator of a train.

The service information accumulation unit 42 accumulates the service information associated by the service information management unit 41. FIG. 3 is a table illustrating an example of the service information accumulated in the service information accumulation unit 42 of the management server 40 according to the first embodiment. The example of FIG. 3 indicates that, for each acquired date and time, the service information accumulation unit 42 accumulates information on an operator identifier (ID) for identifying the operator 1 currently operating the train 100, a speed of the train 100, a power running state of the train 100, a temperature around the train 100, and a heart rate of the operator 1 as the service information. Here, the information on the operator ID, the speed, and the temperature is information acquired from the mobile object information acquisition unit 31 by the service information management unit 41, the information on the power running is information acquired from the driving operation reception unit 32 by the service information management unit 41, and the information on the heart rate is information acquired from the operator information accumulation unit 21 by the service information management unit 41. In the example of FIG. 3, the service information management unit 41 causes the service information accumulation unit 42 to accumulate the acquired information as the service information in association with the acquisition date and time. FIG. 3 illustrates the example in which the service information management unit 41 associates the operator information, the mobile object information, and the operation information as the service information.

The individual identification unit 45 identifies the operator 1 who is currently operating the train 100 on the basis of the information acquired by the service information management unit 41. Among the information acquired by the service information management unit 41, for example, for the operator information, the individual identification unit 45 identifies the operator 1 by the type, model number, or the like of the biosensor 10, or identifies the operator 1 by the operator ID or the like for the mobile object information and the operation information. As a result, the individual identification unit 45 can determine from which operator 1 each information acquired by the service information management unit 41 has been acquired.

The determination logic setting unit 43 sets a determination logic for the determination unit 46 to determine the operating state of the operator 1 on the basis of the service information accumulated in the service information accumulation unit 42. In addition, the determination logic setting unit 43 updates the determination logic accumulated in the determination logic accumulation unit 44 on the basis of the service information accumulated in the service information accumulation unit 42. Determining the operating state of the operator 1 is to predict the occurrence of a human error by the operator 1. The human error is, for example, a violation such as overrun of the train 100 by the operator 1 or overspeed of the train 100 by the operator 1. When such a human error occurs, the operator 1 may perform an operation such as abrupt steering or hard braking, which may affect the ride quality or the like of the passengers on the train 100. Therefore, predicting the occurrence of a human error, that is, determining the operating state of the operator 1, is an important operation in the regular service of the train 100. When setting and updating the determination logic, the determination logic setting unit 43 sets and updates the determination logic for each operator 1 on the basis of an identification result by the individual identification unit 45. That is, the determination logic setting unit 43 sets and updates the determination logic for each operator 1 by preferentially adopting the service information acquired from the same operator 1 and accumulated in the service information accumulation unit 42.

Note that when the determination logic setting unit 43 sets the determination logic on the basis of the service information accumulated in the service information accumulation unit 42, a designer or the like sets the determination logic for a phenomenon subjected to determination of the operating state of the operator 1 by the determination unit 46. For example, in order to determine the possibility of overspeed of the train 100 in the determination unit 46, the designer sets information indicating that a state of "oo" km/h or faster is a state of overspeed. In addition, in order to determine the possibility of overrun of the train 100 in the determination unit 46, the designer sets information indicating that the train is in an overrun state when going beyond a prescribed stop position by "xx" meters or more. The determination logic setting unit 43 can set the determination logic by detecting a feature value or the like from the service information when the phenomenon occurs, on the basis of the information set by the designer. A specific example of the determination logic will be described later.

The determination logic accumulation unit 44 accumulates the determination logic set or updated by the determination logic setting unit 43.

The determination unit 46 determines the operating state of the operator 1 using the determination logic accumulated in the determination logic accumulation unit 44. Specifically, the determination unit 46 determines the possibility of occurrence of a human error by the operator 1 from the current service information acquired by the service information management unit 41 and the determination logic accumulated in the determination logic accumulation unit 44. The determination unit 46 determines the operating state of the operator 1 by performing individual identification on the service information on the basis of the identification result by the individual identification unit 45, and preferentially acquiring the determination logic of the operator 1 from the determination logic accumulation unit 44. The determination unit 46 can determine the operating state according to each operator 1 by using the determination logic for each operator 1.

Note that the arrangement of the components of the driving operation management system 50 illustrated in FIG. 1 is an example, and the present invention is not limited thereto. For example, the management server 40 may include the operator information accumulation unit 21 and the notification unit 22.

Next, an operation of the driving operation management system 50 will be described. First, an operation in which the driving operation management system 50 determines the operating state of the operator 1 of the train 100 will be described. FIG. 4 is a flowchart illustrating the operation in which the driving operation management system 50 according to the first embodiment determines the operating state of the operator 1 of the train 100. In the driving operation management system 50, the service information management unit 41 of the management server 40 acquires the service information (step S1). Specifically, the service information management unit 41 acquires the mobile object information from the mobile object information acquisition unit 31, acquires the operation information from the driving operation reception unit 32, and acquires the operator information from the operator information accumulation unit 21.

The determination unit 46 determines the operating state of the operator 1 using the service information acquired by the service information management unit 41 (step S2). Specifically, the determination unit 46 predicts the occurrence of a human error by the operator 1 as described above. Here, first, the individual identification unit 45 identifies an individual for the service information acquired by the service information management unit 41. The determination unit 46 acquires the determination logic of the operator 1 from the determination logic accumulation unit 44 on the basis of the identification result by the individual identification unit 45.

A specific example of determining the operating state of the operator 1 in the determination unit 46 will be described. For example, it is assumed that the blood glucose level and the blood pressure are detected as the biological information of the operator 1, and a determination logic of "determination logic #1: when the blood glucose level and the blood pressure are low, drowsiness tends to be high so that drowsy driving may occur" is accumulated in the determination logic accumulation unit 44. When detecting that the blood glucose level of the operator 1 is lower than the average and the blood pressure is also lower than the average in the service information acquired by the service information management unit 41, the determination unit 46 extracts the determination logic #1 matching the detected phenomenon from the determination logic accumulation unit 44. The determination unit 46 determines a determination level from the actual blood glucose level and blood pressure. The determination level is, for example, a specific numerical value, and varies depending on a difference between the numerical value indicated by the determination logic and the numerical value indicated by the service information. The determination unit 46 outputs the determined determination level to the notification unit 22 as a determination result.

The notification unit 22 notifies the operator 1 of the determination result acquired from the determination unit 46 of the management server 40 by a method such as sound or screen display (step S3). It is assumed that the content of notification made according to the determination result is stored in the notification unit 22 in advance. FIG. 5 is a table illustrating an example of the content of the notification made by the terminal device 20 of the driving operation management system 50 according to the first embodiment. For example, in a case where the determination result by the determination unit 46 of the management server 40 indicates the operating state of the operator 1 by the determination level that is a numerical value, it is assumed that the notification unit 22 stores information on a notification method for each determination level. In the example of FIG. 5, it is assumed that the larger the numerical value of the determination level, the higher the probability of occurrence of a human error by the operator 1. In a case where the determination level by the determination unit 46 is "100", the notification unit 22 makes notification by sound with the content of "sound 2" and also makes notification by screen display with the content of "alert Lv. 3". As a result, the operator 1 can grasp the current operating state by checking the content of the notification by the notification unit 22.

Note that, in the driving operation management system 50, in a case where a conductor is on board the train 100 and carries the terminal device 20 or a device equivalent to the terminal device 20, the determination unit 46 may also notify the device carried by the conductor of the determination result. As a result, the conductor on board the train 100 can also grasp the operating state of the operator 1.

Next, an operation in which the driving operation management system 50 updates the determination logic accumulated in the determination logic accumulation unit 44 will be described. FIG. 6 is a flowchart illustrating the operation in which the driving operation management system 50 according to the first embodiment updates the determination logic. In the driving operation management system 50, the service information management unit 41 of the management server 40 acquires the service information (step S11). Specifically, the service information management unit 41 acquires the mobile object information from the mobile object information acquisition unit 31, acquires the operation information from the driving operation reception unit 32, and acquires the operator information from the operator information accumulation unit 21. The service information management unit 41 associates the acquired information with one another and causes the service information accumulation unit 42 to accumulate the information as the service information (step S12).

The determination logic setting unit 43 updates the determination logic accumulated in the determination logic accumulation unit 44 using the service information accumulated in the service information accumulation unit 42 (step S13). As described above, the determination logic setting unit 43 performs individual identification on the service information accumulated in the service information accumulation unit 42, and preferentially uses the service information for the identified operator 1 when updating the determination logic of each operator 1. The determination logic setting unit 43 can also reflect a common characteristic not related to the operator 1 in the determination logic by using the service information acquired from other than the operator 1. Specifically, the determination logic setting unit 43 can automatically update the determination logic by using artificial intelligence (AI) technology, deep learning, or the like, but may update the determination logic by receiving a manual operation. The determination logic setting unit 43 automatically updates the determination logic at a predetermined timing. The predetermined timing may be, for example, a time interval such as "every 10 seconds" or may be when an event such as "arriving at the station" occurs, but is not limited thereto.

An example of updating a specific determination logic in the determination logic setting unit 43 will be described. For example, it is assumed that a determination logic of "determination logic #2: there is a possibility of overspeed when the heart rate of the operator 1 is 100 or higher" is accumulated in the determination logic accumulation unit 44. When overspeed is detected in speed information in the mobile object information acquired from the train 100, the determination logic setting unit 43 checks the service information when the overspeed is detected that is accumulated in the service information accumulation unit 42. When the heart rate of the operator 1 is 90 in the service information that has been checked, the determination logic setting unit 43 updates the determination logic accumulated in the determination logic accumulation unit 44 to "determination logic #2: there is a possibility of overspeed when the heart rate of the operator 1 is 90 or higher". As a result, the determination unit 46 can improve the accuracy of determining the occurrence of a human error by the operator 1 by using the updated determination logic.

Note that as illustrated in FIG. 2, in the present embodiment, the management server 40 is installed on the train 100. Therefore, when there is a plurality of the trains 100, the service information accumulation unit 42 and the determination logic accumulation unit 44 included in the management server 40 on each train 100 may accumulate different information, specifically, the service information and the determination logic having different content. Moreover, in a case where a certain operator 1 boards a plurality of different trains 100 of the same type, each train 100 needs to start from the setting of the determination logic for the operator 1 who boards the train for the first time. Thus, the service information and the information of the determination logic accumulated by the management server 40 may be shared or transferred between the trains 100. Sharing or transferring of the information between the trains 100 may be performed by the trains 100 directly performing wireless communication or wired communication to transmit and receive the information, may be performed via a ground system not illustrated, or may be performed via a storage medium not illustrated.

Next, a hardware configuration of the driving operation management system 50 will be described. In the driving operation management system 50, the biosensor 10 including the biological information acquisition unit 11 is a general sensor such as a heart rate meter as described above. In the terminal device 20, the notification unit 22 is a monitor such as a liquid crystal display (LCD), a device that outputs sound, or the like for notifying the operator 1 or the like of the determination result by the determination unit 46. The operator information accumulation unit 21 is implemented by processing circuitry. The integrated train management apparatus 30 including the mobile object information acquisition unit 31 and the driving operation reception unit 32 is a general integrated train management system as described above. In the management server 40, the service information accumulation unit 42 and the determination logic accumulation unit 44 are memories. The service information management unit 41, the determination logic setting unit 43, the individual identification unit 45, and the determination unit 46 are implemented by processing circuitry. The processing circuitry may include a memory and a processor executing programs stored in the memory, or may include dedicated hardware.

FIG. 7 is a diagram illustrating an example of a case where the processing circuitry of the management server 40 or the like according to the first embodiment includes a processor and a memory. When the processing circuitry includes a processor 91 and a memory 92, each function of the processing circuitry of the management server 40 or the like is implemented by software, firmware, or a combination of software and firmware. The software or firmware is described as programs and stored in the memory 92. The processing circuitry implements each function by the processor 91 reading and executing the programs stored in the memory 92. That is, the processing circuitry includes the memory 92 for storing the programs that result in the execution of the processing of the management server 40 or the like. It can also be said that these programs cause a computer to execute the procedure and method related to the management server 40 or the like.

Here, the processor 91 may be a central processing unit (CPU), a processing unit, an arithmetic unit, a microprocessor, a microcomputer, a digital signal processor (DSP), or the like. The memory 92 corresponds to, for example, a non-volatile or volatile semiconductor memory such as a random access memory (RAM), a read only memory (ROM), a flash memory, an erasable programmable ROM (EPROM), or an electrically EPROM (EEPROM (registered trademark)), a magnetic disk, a flexible disk, an optical disk, a compact disc, a mini disc, a digital versatile disc (DVD), or the like.

Figure 8:
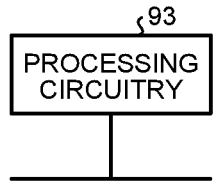
FIG. 8 is a diagram illustrating an example of a case where the processing circuitry of the management server or the like according to the first embodiment includes dedicated hardware.

FIG. 8 is a diagram illustrating an example of a case where the processing circuitry of the management server 40 or the like according to the first embodiment includes dedicated hardware. When the processing circuitry includes dedicated hardware, processing circuitry 93 illustrated in FIG. 8 corresponds to a single circuit, a complex circuit, a programmed processor, a parallel-programmed processor, an application specific integrated circuit (ASIC), a field programmable gate array (FPGA), or a combination of those, for example. The functions of the management server 40 or the like may be implemented individually or collectively by the processing circuitry 93.

Note that the functions of the management server 40 or the like may be implemented partly by dedicated hardware and partly by software or firmware. The processing circuitry can thus implement the aforementioned functions by the dedicated hardware, software, firmware, or a combination of these.

As described above, according to the present embodiment, the driving operation management system 50 combines the biological information of the operator 1 who is driving with the service information that can be acquired from the train 100, thereby being able to predict the occurrence of a human error by the operator 1 and avoid the occurrence of a human error by notifying the operator 1 of the prediction. Moreover, the driving operation management system 50 quickly detects poor physical condition of the operator 1 such as a sudden illness or seizure and notifies the conductor or the ground system of the detected physical condition, thereby being able to more reliably deal with the situation. Furthermore, the driving operation management system 50 updates the determination logic by performing individual identification, and can thus perform the determination in consideration of individual differences. The driving operation management system 50 can also collect and accumulate the operator information outside the train 100 by separating the operator information accumulation unit 21 from the management server 40. In addition, the driving operation management system 50 can use the biological information acquired when a different train 100 is operated as common information when another train 100 is operated. Therefore, the driving operation management system 50 can improve the accuracy of determining the operating state of the operator 1 who operates the train 100.

Second Embodiment

As the operator information, a second embodiment further uses operator behavior information obtained by detecting a motion of the operator 1 while he operates the train. Differences from the first embodiment will be described.

Figure 9:
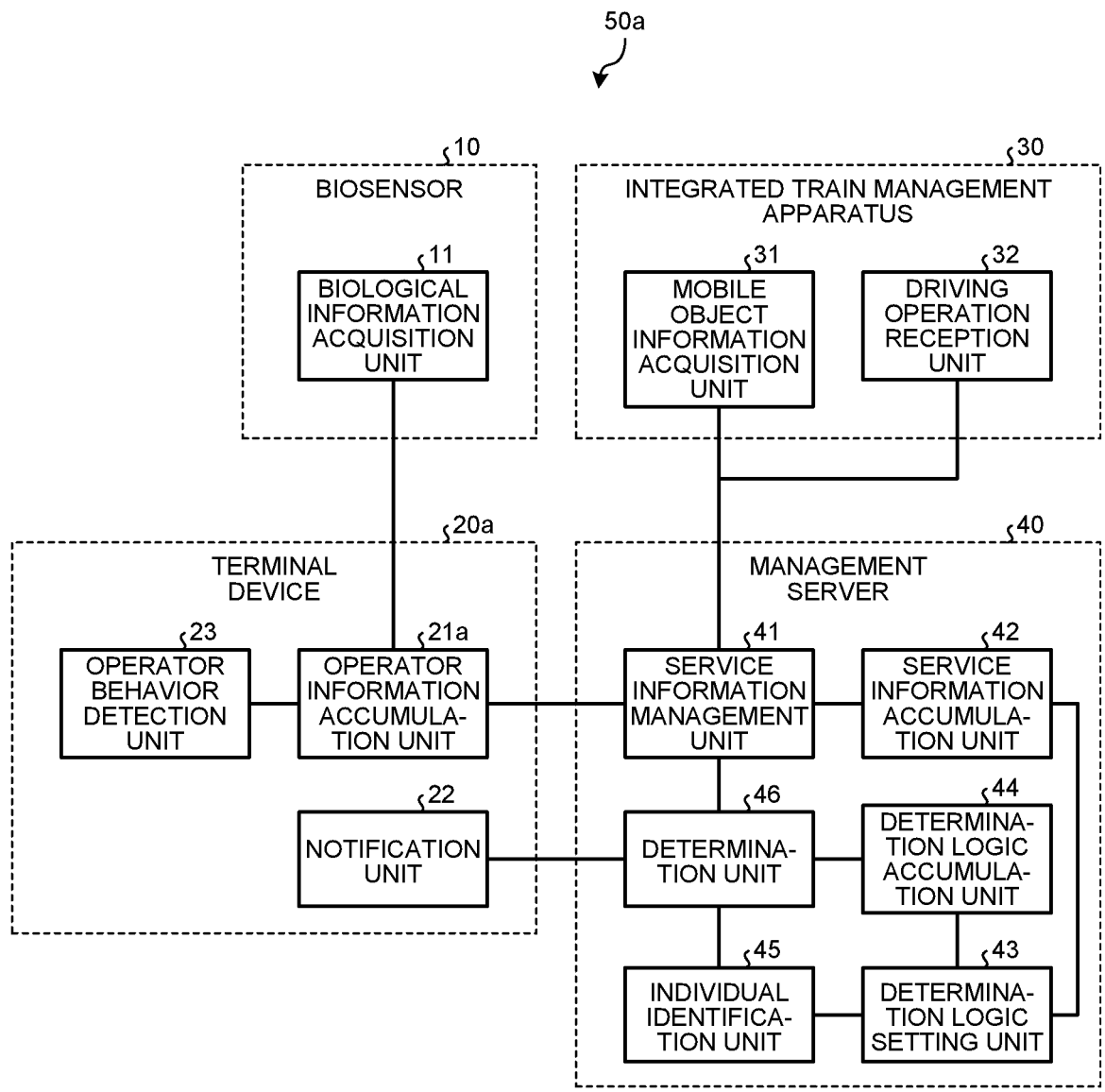
FIG. 9 is a block diagram illustrating an example of a configuration of a driving operation management system according to a second embodiment.

FIG. 9 is a block diagram illustrating an example of a configuration of a driving operation management system 50a according to the second embodiment. The driving operation management system 50a is obtained by replacing the terminal device 20 in the driving operation management system 50 of the first embodiment illustrated in FIG. 1 with a terminal device 20a. The terminal device 20a includes an operator information accumulation unit 21a, the notification unit 22, and an operator behavior detection unit 23. The operator behavior detection unit 23 detects a motion of the operator 1 and causes the operator information accumulation unit 21a to accumulate operator behavior information, which is information on the detected motion of the operator 1, as the operator information. The motion of the operator 1 includes, but is not limited to, pointing and calling by the operator 1, a line of sight of the operator 1, and the like. The operator behavior detection unit 23 is, for example, a camera capable of capturing the motion of the operator 1. The operator information accumulation unit 21a includes the function of the operator information accumulation unit 21 of the first embodiment and the function of accumulating the operator behavior information as the operator information. The operator information accumulation unit 21a outputs, as the operator information, biological information acquired from the biosensor 10 and the operator behavior information acquired from the operator behavior detection unit 23 to the service information management unit 41.

In the management server 40, the service information management unit 41 associates the operator information including the biological information and the operator behavior information, the mobile object information, and the operation information, thereby causing the service information accumulation unit 42 to accumulate them as service information. The determination logic setting unit 43 sets and updates the determination logic using the service information including the operator behavior information. The determination unit 46 determines an operating state of the operator 1 using the service information including the operator behavior information. For example, when the operator 1 has forgotten to perform pointing and calling, the determination logic setting unit 43 determines that the operator 1 is not concentrating on driving and sets a determination logic for the possibility of overspeed or overrun. When the operator information acquired by the service information management unit 41 indicates that pointing and calling by the operator 1 has been forgotten, the determination unit 46 can increase the determination level and determine that there is a possibility of occurrence of overspeed, overrun, or the like.

A specific example of determining the operating state of the operator 1 in the determination unit 46 will be described. For example, it is assumed that a body temperature and brain waves are detected as the biological information of the operator 1, a blink speed of the operator 1 is detected as the operator behavior information of the operator 1, and a determination logic of "determination logic #3: when ΔΔ seconds or longer have elapsed from the last operation and a decrease in the blink speed, a decrease in the brain function, and an increase in the body temperature are detected, drowsiness tends to be high so that drowsy driving may occur" is accumulated in the determination logic accumulation unit 44. When the blink speed, the brain waves, and the body temperature of the operator 1 match the determination logic #3 in the service information acquired by the service information management unit 41, the determination unit 46 determines a determination level regarding the possibility of drowsy driving of the operator 1 and outputs the determination level as a determination result to the notification unit 22. As a result, the operator 1 can grasp the current operating state by checking the content of the notification by the notification unit 22.

A flowchart for illustrating the operation of the driving operation management system 50a is similar to the flowchart of the operation of the driving operation management system 50 of the first embodiment illustrated in FIGS. 4 and 6. In a hardware configuration of the driving operation management system 50a, the operator behavior detection unit 23 is a sensor such as a camera as described above.

As described above, according to the present embodiment, the driving operation management system 50a can further improve the accuracy of determining the operating state of the operator 1 by using, as the operator information, the operator behavior information indicating the behavior of the operator 1 that is significantly related to driving together with the biological information. The driving operation management system 50a can also point out simple omission of checking by the operator 1 or the like, and can cause the operator 1 to operate the train 100 more reliably.

Note that the driving operation management system 50a uses the biological information and the operator behavior information as the operator information, but is not limited to such a configuration. The driving operation management system 50a may use only the operator behavior information as the operator information.

Third Embodiment

As the operator information, a third embodiment further uses living information of the operator 1 obtained when he is not operating the train. Differences from the first embodiment will be described. Note that although the description will be made using the first embodiment as an example, the description is also applicable to the second embodiment.

Figure 10:
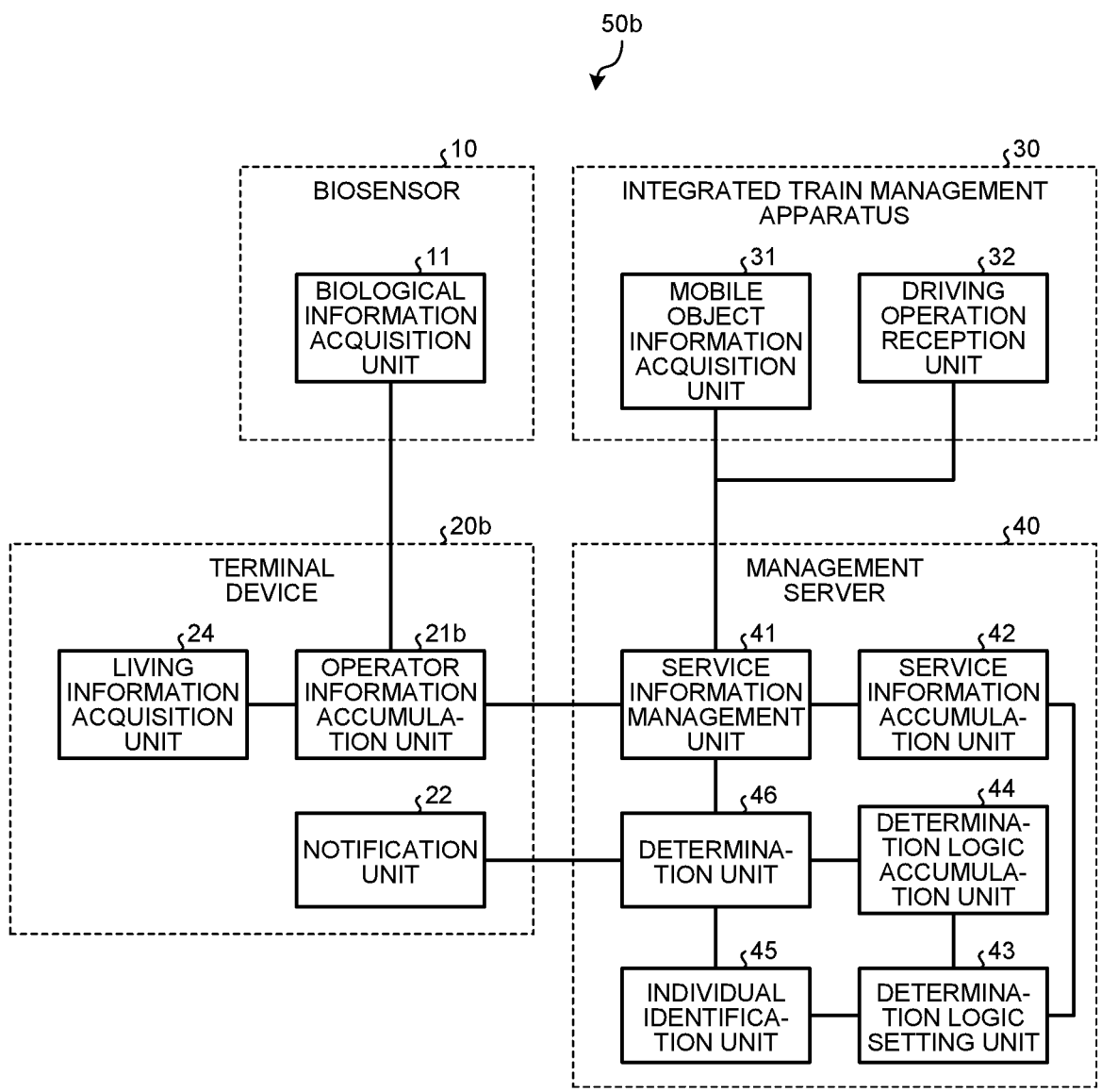
FIG. 10 is a block diagram illustrating an example of a configuration of a driving operation management system according to a third embodiment.

FIG. 10 is a block diagram illustrating an example of a configuration of a driving operation management system 50b according to the third embodiment. The driving operation management system 50b is obtained by replacing the terminal device 20 in the driving operation management system 50 of the first embodiment illustrated in FIG. 1 with a terminal device 20b. The terminal device 20b includes an operator information accumulation unit 21b, the notification unit 22, and a living information acquisition unit 24. The living information acquisition unit 24 acquires the living information indicating a living condition of the operator 1, and causes the operator information accumulation unit 21b to accumulate the acquired living information as the operator information. The living information of the operator 1 is information other than that related to the train service by the operator 1, specifically, information such as hours of sleep or whether or not the operator has an illness. For example, the living information acquisition unit 24 may cause the operator 1 to input information such as the hours of sleep of the operator 1 on the previous day or whether or not he had breakfast in a questionnaire form, or may have a sleep hour acquisition application or the like included in the terminal device 20b in advance and automatically acquire the information. The living information acquisition unit 24 is, for example, an input interface such as a button or a keyboard with which the operator 1 can input information. The operator information accumulation unit 21b includes the function of the operator information accumulation unit 21 of the first embodiment and the function of accumulating the living information as the operator information. The operator information accumulation unit 21b outputs, as the operator information, biological information acquired from the biosensor 10 and the living information acquired from the living information acquisition unit 24 to the service information management unit 41.

In the management server 40, the service information management unit 41 associates the operator information including the biological information and the living information, the mobile object information, and the operation information, thereby causing the service information accumulation unit 42 to accumulate them as service information. The determination logic setting unit 43 sets and updates the determination logic using the service information including the living information. The determination unit 46 determines an operating state of the operator 1 using the service information including the living information. For example, in a case where the operator 1 had short hours of sleep on the previous day, the determination logic setting unit 43 sets a determination logic for the possibility of overrun by the operator 1. When the operator information acquired by the service information management unit 41 indicates that the operator 1 had short hours of sleep on the previous day, the determination unit 46 can increase the determination level and determine that there is a possibility of occurrence of overrun.

A specific example of determining the operating state of the operator 1 in the determination unit 46 will be described. For example, it is assumed that the heart rate and the amount of perspiration are detected as the biological information of the operator 1, information that the hours of sleep of the operator 1 on the previous day are five hours is acquired as the living information of the operator 1, and a determination logic of "determination logic #4: when the hours of sleep are within six hours, the heart rate is 80 or higher, and the amount of perspiration is high, there is a possibility of overrun" is accumulated in the determination logic accumulation unit 44. When the information on the heart rate and amount of perspiration of the operator 1 and the hours of sleep of the operator 1 on the previous day in the service information acquired by the service information management unit 41 matches the determination logic #4, the determination unit 46 determines the determination level regarding the possibility of overrun by the operator 1 and provides notification to the operator 1 via the notification unit 22.

A flowchart for illustrating the operation of the driving operation management system 50b is similar to the flowchart of the operation of the driving operation management system 50 of the first embodiment illustrated in FIGS. 4 and 6. In a hardware configuration of the driving operation management system 50b, the living information acquisition unit 24 is the input interface such as a button or a keyboard as described above.

As described above, according to the present embodiment, the driving operation management system 50b can further improve the accuracy of determining the operating state of the operator 1 by using, as the operator information, the living information such as information that cannot be acquired by the biological information acquisition unit 11 and information that does not change with time together with the biological information.

Note that the driving operation management system 50b may further use the operator behavior information described in the second embodiment. This allows the driving operation management system 50b to further improve the accuracy of determining the operating state of the operator 1. In this case, the operator information accumulation unit 21b outputs, as the operator information, the biological information acquired from the biosensor 10, the operator behavior information acquired from the operator behavior detection unit 23, and the living information acquired from the living information acquisition unit 24 to the service information management unit 41. In the management server 40, the service information management unit 41 associates the operator information including the biological information, the operator behavior information, and the living information, the mobile object information, and the operation information, thereby causing the service information accumulation unit 42 to accumulate them as the service information.

Fourth Embodiment

In a fourth embodiment, route information on a route on which the train 100 travels is included in the service information. Differences from the first embodiment will be described. Note that although the description will be made using the first embodiment as an example, the description is also applicable to the second and third embodiments.

Figure 11:
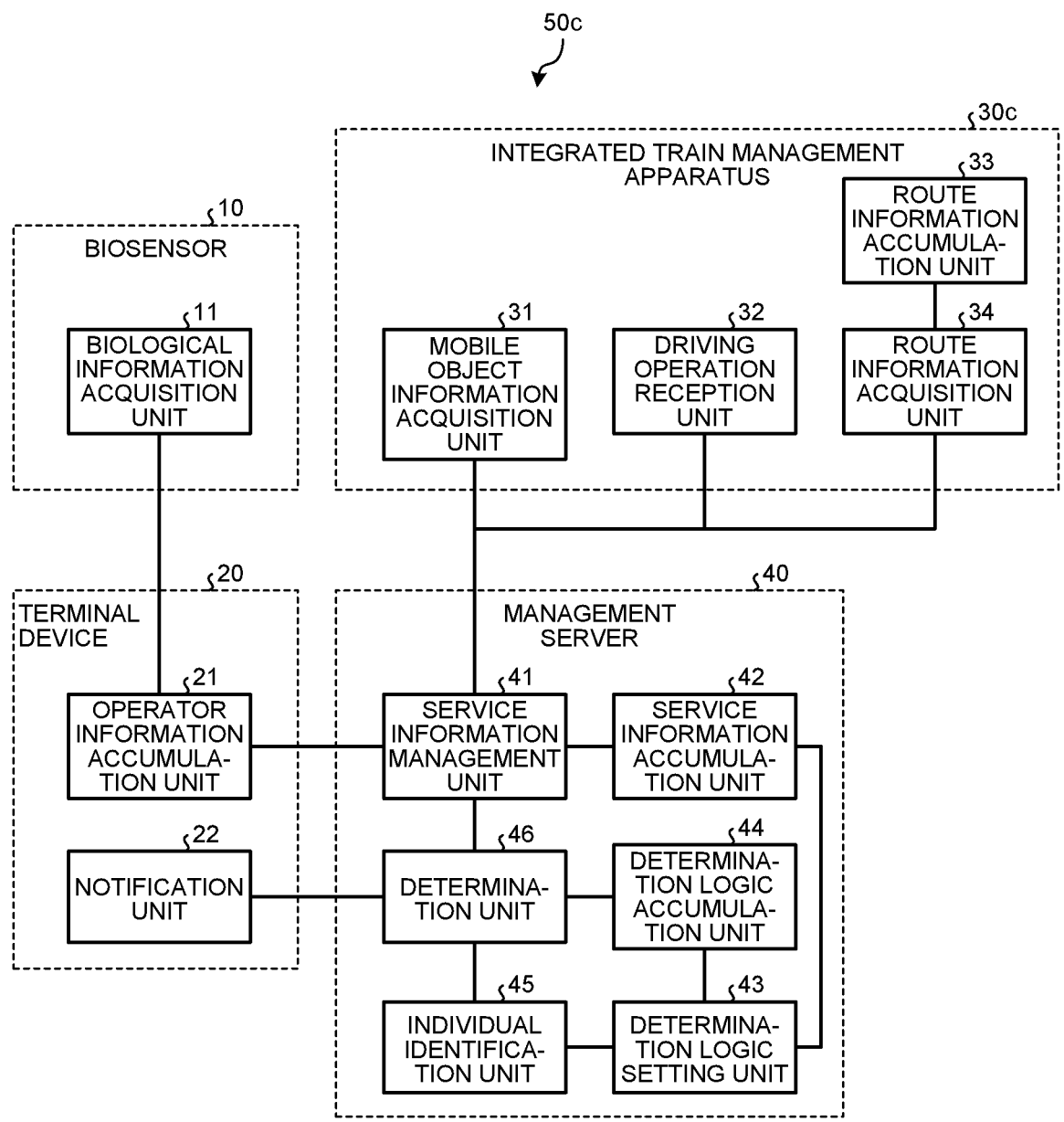
FIG. 11 is a block diagram illustrating an example of a configuration of a driving operation management system according to a fourth embodiment.

FIG. 11 is a block diagram illustrating an example of a configuration of a driving operation management system 50c according to the fourth embodiment. The driving operation management system 50c is obtained by replacing the integrated train management apparatus 30 in the driving operation management system 50 of the first embodiment illustrated in FIG. 1 with an integrated train management apparatus 30c. The integrated train management apparatus 30c includes the mobile object information acquisition unit 31, the driving operation reception unit 32, a route information accumulation unit 33, and a route information acquisition unit 34. The route information accumulation unit 33 accumulates the route information that is information on a route on which the train 100 travels. The route information is information associated with the route such as a landmark or a gradient. The landmark is, for example, a traffic light, a railroad crossing, a sign, or the like. The route information acquisition unit 34 acquires, from the route information accumulation unit 33, the route information on a route on which the train 100 currently travels. The route information acquisition unit 34 outputs the acquired route information to the service information management unit 41. The route information acquisition unit 34 identifies necessary route information by using a route name, a distance from a station, or the like. The route information may also include weather information at a travel point. The route information acquisition unit 34 may acquire the weather information at the travel point from an external device (not illustrated) via a communication device (not illustrated).

In the management server 40, the service information management unit 41 associates the operator information, the mobile object information, the operation information, and the route information, thereby causing the service information accumulation unit 42 to accumulate them as service information. That is, the service information management unit 41 causes the service information accumulation unit 42 to accumulate the service information including the route information. The determination logic setting unit 43 sets and updates the determination logic using the service information including the route information. The determination unit 46 determines an operating state of the operator 1 using the service information including the route information. For the heart rate and the amount of perspiration of the operator 1, the determination logic setting unit 43 changes the content of the determination logic for overspeed depending on the travel route of the train 100 such as between a straight section and a curved section. On the basis of the route information included in the service information acquired by the service information management unit 41, the determination unit 46 can determine the operating state of the operator 1 using the determination logic that matches the condition of the current travel route. The determination unit 46 can, for example, determine the possibility of overspeed of the train 100 using the determination logic that matches the condition of the current travel route.

A flowchart for illustrating the operation of the driving operation management system 50c is similar to the flowchart of the operation of the driving operation management system 50 of the first embodiment illustrated in FIGS. 4 and 6. In a hardware configuration of the driving operation management system 50c, the route information accumulation unit 33 is a memory. The route information acquisition unit 34 is implemented by processing circuitry.

As described above, according to the present embodiment, the driving operation management system 50c includes the route information on the route on which the train 100 travels in the service information, thereby being able to set and update the determination logic using the service information of a similar travel route, and further improve the accuracy of determining the operating state of the operator 1. Since points to be noted are different depending on the travel route, the driving operation management system 50c can provide information according to the travel route.

The configuration illustrated in the above embodiment merely illustrates an example of the content of the present invention, and can thus be combined with another known technique or partially omitted and/or modified without departing from the scope of the present invention.

REFERENCE SIGNS LIST

1 operator; 10 biosensor; 11 biological information acquisition unit; 20, 20a, 20b terminal device; 21, 21a, 21b operator information accumulation unit; 22 notification unit; 23 operator behavior detection unit; 24 living information acquisition unit; 30, 30a, 30c integrated train management apparatus; 31 mobile object information acquisition unit; 32 driving operation reception unit; 33 route information accumulation unit; 34 route information acquisition unit; 40 management server; 41 service information management unit; 42 service information accumulation unit; 43 determination logic setting unit; 44 determination logic accumulation unit; 45 individual identification unit; 46 determination unit; 50, 50a, 50b, 50c driving operation management system; 60 cab; 61 NFB; 62, 63 RIO; 64, 65, 66 BECU; 67 VVVF; 100 train; 101 first car; 102 middle car.

The invention claimed is:

1. A driving operation management system comprising:
an operator information accumulation circuitry to accumulate operator information that is information indicating a state of an operator of a train;
a biological information acquisition circuitry to detect biological information of the operator and cause the operator information accumulation circuitry to accumulate, as the operator information, the biological information detected;
a mobile object information acquisition circuitry to acquire mobile object information that is information on a service state of the train;
a driving operation reception circuitry to receive a driving operation of the operator;
a service information management circuitry to acquire and associate the operator information and at least one of the mobile object information or operation information that indicates the driving operation received by the driving operation reception circuitry, and cause the acquired and associated information to be accumulated as service information;
a service information accumulation circuitry to accumulate the service information;
a determination logic setting circuitry to set a determination logic for determining the prediction of the occurrence of a human error by an operating state of the operator on the basis of the service information accumulated in the service information accumulation circuitry;
a determination logic accumulation circuitry to accumulate the determination logic;
a determination circuitry to determine the operating state of the operator using the determination logic accumulated in the determination logic accumulation circuitry; and
a notification circuitry to make a notification about a determination result by the determination circuitry according to content of the determination result.

2. The driving operation management system according to claim 1, wherein
the determination logic setting circuitry updates the determination logic accumulated in the determination logic accumulation circuitry on the basis of the service information.

3. The driving operation management system according to claim 2, further comprising:
an individual identification circuitry to identify the operator on the basis of the information acquired by the service information management circuitry, wherein
the determination logic setting circuitry sets and updates the determination logic for each operator on the basis of an identification result by the individual identification circuitry, and
the determination circuitry determines the operating state of each operator using the determination logic for each operator.

4. The driving operation management system according to claim 1, further comprising:
an operator behavior detection circuitry to detect a motion of the operator and cause the operator information accumulation circuitry to accumulate, as the operator information, operator behavior information that is information on the motion of the operator detected.

5. The driving operation management system according to claim 1, further comprising:
a living information acquisition circuitry to acquire living information indicating a living condition of the operator and cause the operator information accumulation circuitry to accumulate, as the operator information, the living information acquired.

6. The driving operation management system according to claim 1, further comprising:
a route information accumulation circuitry to accumulate route information that is information on a route on which the train travels; and
a route information acquisition circuitry to acquire route information about a route on which the train currently travels from the route information accumulation circuitry, and output the route information to the service information management unit, wherein the service information management circuitry causes the service information accumulation circuitry to accumulate the service information including the route information.

7. The driving operation management system according to claim 4, further comprising:
   living information acquisition circuitry to acquire living information indicating a living condition of the operator and cause the operator information accumulation circuitry to accumulate, as the operator information, the living information acquired.

* * * * *